United States Patent [19]

Desserre

[11] 4,261,024
[45] Apr. 7, 1981

[54] TRANSDUCER PLATFORM

[75] Inventor: Jacques Desserre, Rambouillet, France

[73] Assignee: Compagnie Internationale pour l-Informatique Cii-Honeywell Bull (Societe Anonyme), Paris, France

[21] Appl. No.: 37,725

[22] Filed: May 10, 1979

[30] Foreign Application Priority Data

May 26, 1978 [FR] France ............... 78 15765

[51] Int. Cl.³ .............. G11B 21/16; G11B 5/48; G11B 5/60
[52] U.S. Cl. .................... 360/103; 360/104
[58] Field of Search ..................... 360/104, 103

[56] References Cited

U.S. PATENT DOCUMENTS

| 2,772,135 | 11/1956 | Hollabaugh et al. | 360/103 |
|---|---|---|---|
| 3,349,384 | 10/1967 | Kohn | 360/104 |
| 3,582,920 | 6/1971 | Billawala | 360/103 |
| 3,896,494 | 7/1975 | Tamura | 360/103 |
| 3,913,138 | 10/1975 | Stankiewicz et al. | 360/103 |
| 4,081,846 | 3/1978 | Roscamp et al. | 360/103 |
| 4,130,847 | 12/1978 | Head et al. | 360/103 |

Primary Examiner—Robert S. Tupper
Attorney, Agent, or Firm—Kerkam, Stowell, Kondracki & Clarke

[57] ABSTRACT

A platform for supporting at least one magnetic transducer for reading from and/or recording on a data carrier. The platform is supported from a carrier arm adapted to position the platform over the data carrier which may be a multi-track disc. The magnetic transducer is supported in the lower face of the main body of the platform. The lower face includes a plurality of skids and one or more grooves which receive a rigid strut for suspending the platform over the carrier. The strut is secured in the groove (s) with the plane of the strut passing through the centers of gravity of the platform. The strut may be secured to a frame surrounding the platform which in turn may be secured to a further concentric frame also surrounding the platform.

11 Claims, 10 Drawing Figures

TRANSDUCER PLATFORM

BACKGROUND OF THE INVENTION

1. Field of the Invention

The present invention relates to a platform for supporting at least one tranducer for reading from and/or recording on a data carrier. It is particularly applicable to magnetic reading and/or recording transducers for magnetic peripherals of data processing system, in particular disc memories.

2. Description of the Prior Art

The use of magnetic disc memories in data processing system is becoming increasingly popular because of their storage capacity and the relatively short time required to access data contained anywhere on the discs from the moment when the associated magnetic transducers receive an order from the processing system.

It is known that magnetic discs carry data on concentric, circular recording tracks whose radial width does not exceed a few hundredth of a millimeter and which generally cover the major proportion of both faces of the discs. The discs, which are parallelly and coaxially arranged, and usually of the same diameter, are driven in rotation at constant speed by an electric motor.

Current practice is generally to associate one or more transducers with each face of a disc, the number of transducers being very much smaller than the number of tracks. The tracks may be several hundred in number, but the number of transducers generally does not exceed approximately ten or twenty and is often equal to one. A plurality of transducers is used rather than only one when it is desired to achieve a substantial reduction in the time to access any item of data contained on on the face of a disc.

In a known manner, the transducers have electrical input and/or output wires connected to the electronic read and/or write circuits of the disc memory with which each transducer is associated. When the data recorded on face of a magnetic discs is to be read and the disc passes in front of the transducer or tranducers associated with this face, electrical signals are fed to the electronic read circuits via the electrical wires. Conversely, it will be clear that when the electronic circuits feed electrical signals to the transducer or transducers via the said electrical wires, data is recorded on the face of the associated magnetic disc.

In a known manner, transducers have a magnetic circuit provided with an air gap, around which a winding is arranged on to which is connected the electrical input and/or output wires. The air gap of each transducer is arranged opposite the face of the disc with which the transducer is associated, at a distance of a few microns, or even a few tenths of a micron so as to enable data to be read and/or recorded. It can therefore be said that the air gap constitutes the means by which the transducer picks up and/or records the data contained on the said face.

Current practice is for the transducers associated with one and the same face of a disc to be arranged on a single platform, which has to be moved radially with respect to the disc and above (adjacent) its face so that the transducers can access any item of data contained on the said face.

Such platforms are called "moving" platforms.

There are also known so-called "fixed" platforms which, during a read and/or write operation, remain at all times stationary above (adjacent) clearly defined tracks on the face of the associated disc. In such an arrangement, each transducer on a platform is associated with one and the same track.

Whether it is fixed or moving, the platform incorporating or supporting at least one transducer and associated with one face of a disc, is secured to a rigid removable arm. In a case of a moving platform, the arm is mounted on a carriage which moves externally of the discs, whereas in the case of a fixed platform the arm is mounted directly on the framework of the disc memory to which the disc belongs.

Regardless of the type platform, i.e. whether fixed or moving, the platform essentially comprises two parts, the "main body" and the suspension mechanism or means. The "main body" of the platform incorporates the transducers, and the suspension means has one end secured to the main body and its other end secured to the rigid removable arm.

Generally, but not exclusively, the main body of a platform is in the form a relatively shallow right-angled parallelepiped of which one major face, which for convenience is termed the "lower" face, contains the means or the transducers for picking up and/or recording data. The major face is for convenience termed the "upper" face and contains the ends of the electrical output and-/or output wires of the transducer or transducers and the means which enable these wires to be connected to the electrical read and/or write circuits of the disc memory.

The terminology of "lower" and "upper face" will be continued throughout the specification; however, it should be noted that these terms merely signify a convenient positional relationship with respect to the platform and are not used in a limiting sense. Thus, they could equally as well be defined as first and second faces, minor and major faces or by any other suitable distinguishing description.

At the present time platforms known to those skilled in the art as "Winchester" platforms are becoming increasingly popular. Such platforms are manufactured by, inter alia, Applied Magnetic Corporation (A.M.C.) under the type numbers 3304 and 3306.

A platform of the "Winchester" type is produced as follows.

In the lower face of its main body are formed one or more gulleys, channels, grooves or the like whose depth is equal to or greater than 30 microns and may be as much as a few tenths of a millimeter. In the art these grooves are sometimes called bleed slots. This arrangement provides on the lower face a plurality of projecting portions which are called skids or longitudinal rails and which are, broadly speaking, ski-shaped.

In operation, as a result of the rotation of the discs, there is developed between the lower face of the main body of the platform and the face of the disc associated with the lower face of the platform, a cushion of compressed air which causes the platform to move away from the disc or rise, prevents the main body of the platform from touching the disc and thus damaging it. The platform is said to fly above the face of the disc with which it is associated.

The cushion of air exerts a pressure force on the surface of the skids or longitudinal rails in a direction generally normal thereto and directed from the lower face to the upper face of the main body of the platform. When in flight, dynamic equilibrium for the platform is achieved by setting up, in opposition to the force generated by the pressure of the cushion of air against the surface of the skids or longitudinal rails, a force termed a "loading force". The loading force is applied to the upper face of the main body and has a modulus equal to that of the pressure force.

It is known that the pressure force is proportional to the surface area of the skids or longitudinal rails. Thus, it can be appreciated that the presence of grooves or bleed slots in the lower face of the platform serves to reduce the surface area of the lower face adjacent a disc and enables the pressure force, and thus the loading force, to be reduced. The loading force is, for example, generated by a prestressed spring secured to the rigid arm carrying the platform. The force is relatively small and of the order of 10 to 20 grams. Because of this it is said that a platform of the "Winchester" type is a lightly loaded platform.

Generally, a platform of the "Winchester" type flies above the face of the disc with which it is associated in such a way that the surface of the skids or longitudinal rails is slightly inclined to the face of the disc. This allows the skids or longitudinal rails on the platform to produce sufficient lift to enable the platform to fly stably above the said face. The total surface area of the skids or longitudinal rails is defined as being the flight surface of the platform. The front of the flight surface is defined as being that part of the flight surface which is the first in time to have pass before it areas of the face of the disc with which it is associated. Similarly, the rear of the flight surface is defined as being that part of the flight surface which is the last in time to have these same areas of the face pass before it.

With magnetic transducers, the air gaps are arranged at the rear of the flight surface. The main body of the platform is inclined to the surface of the disc in such a way that the rear of the platform lies at a distance from the surface of the disc, termed the "altitude of flight". The distance is on the order of a few tenths of a micron and is less than the distance which separates the same face of the platform from the flight surface at the front. The distance of the front is of the order of a few microns.

Because of the fact that platforms of the "Winchester" type are lightly loaded, they enable low altitudes of flight to be achieved. Such platforms make is possible, by reason of their low altitude of flight, to obtain read signals from the transducer or transducers whose amplitude is relatively high, and allows reading of satisfactory reliability. Further, by reason of their light loading, the main body of the platform does not strike against the disc which action might damage both the disc and the main body of the platform.

However, the fact that platforms are lightly loaded does have certain disadvantages, the most important of which is that the flight of the platform above the face of the disc with which it is associated may be relatively unstable. To minimize instability, suspension of the platform should be arranged as close as possible to the face of the disc with which the platform is associated.

The current practice is for the device for suspending platforms of the "Winchester" type, which is generally formed by a resilient leaf spring, to be fixed at one end to the bottom of a groove formed in the upper face of the platform. The aim here is to maintain the point of attachment of the leaf spring close to the center of gravity of the main body of the platform with the object of improving the stability of the platform in flight. The other end of the resilient leaf spring is fixed to the rigid releasable arm which carries the platform. In this description, it will be assumed that the center of gravity of the main body of the platform virtually coincides with the center of gravity of the platform itself.

Thus, it can be appreciated that in a platform of the "Winchester" type, where the main body contains a groove formed in its upper face and a plurality of grooves or bleed slots formed in its lower face, these result in a reduction of rigidity or stiffness in the platform and an increase in its fragility. If the rigidity or stiffness of the main body of the platform is to remain adequate, it becomes necessary to restrict the depth of the groove containing the attachment for the leaf spring. Thus, there is a practical limit to the depth of this groove and it is not possible to move the suspension device sufficiently close to the center of gravity of the platform to avoid all problems connected with in-flight instability on the part of the platform.

SUMMARY OF THE INVENTION

The present invention enables these disadvantages to be overcome by fixing the suspension device to the lower face of the main body of the platform, preferably in the bleed slots or grooves formed in the said lower face, which makes it possible to dispense with the groove conventionally formed in the upper face. This enables the rigidity or stiffness of the main body of the platform to be increased and also its height to be reduced. Furthermore, it is possible to position the point of attachment of the suspension device precisely at the center of gravity of the platform, which considerably increases its stability in flight.

In accordance with the present invention, there is provided a platform for at least one magnetic transducer for reading from and/or recording on a data carrier. The platform includes a main body containing the transducer and a suspension device which is connected on the one hand to the main body and on the other hand to an arm carrying the platform. The lower face of the main body incorporates the heads of the transducer for picking and/or recording data, which heads are arranged facing the data carrier. The invention is characterized in that the suspension device is fixed to the lower face of the main body of the platform. Preferably, the lower face of the platform comprises at least one groove or bleed slot situated between two projecting portions longitudinal rails or skids, and the device for suspending the platform is fixed in the groove or bleed slot.

BRIEF DESCRIPTION OF THE DRAWINGS

Other features and advantages of the invention will become apparent from the following description, which is given by way of non-limiting example, and with reference to the accompanying drawings.

In the drawings:

FIG. 1 represents a prior art platform having at least one transducer, the platform being shown in flight above a magnetic disc, and illustrated in several views, wherein:

FIG. 1a is a view from the side;

FIG. 1b is an end-on view;

FIG. 1c is a view from below as seen from the position of the magnetic disc; and FIG. 1d is a three-quarter perspective view.

FIG. 2 represents a platform according to the invention having at least one transducer, and illustrated in several views wherein:

FIG. 2a is a three-quarter perspective view, the platform being shown in flight above the disc, and FIG. 2b is an end-on view.

DESCRIPTION OF THE PREFERRED EMBODIMENTS

To understand the principles of operation and construction of the platform according to the invention, it may be useful to review a few facts relating to the principles of construction and operation of prior art platforms of the type to which the invention pertains. To this end, reference will be made to FIG. 1. FIG. 1d represents a preferred embodiment of a prior art platform $PL_a$. Platform $PL_a$ comprises a main body $CPL_a$ of substantially parallelepiped shape which is shown in the form of a catamaran having two skids or longitudinal rails $PA_1$ and $PA_2$, best shown in FIG. 1c, between which is situated a groove or bleed slot R, and a suspension device $SUSP_a$.

Each of the two skids $PA_1$ and $PA_2$ contains a transducer $TR_1$ and $TR_2$ respectively, each of which has an air gap $E_1$ and $E_2$, respectively for reading and/or recording data from/on a data carrier. The two skids or longitudinal rails $PA_1$ and $PA_2$ have in the one case a main flight surface $SV_1$ and a bevel $CH_1$ and in the other case a main flight surface $SV_2$ and a bevel $CH_2$. If $s_1$ and $s_2$ are the surfaces of bevels $CH_1$ and $CH_2$ respectively, the flight surface of skid $PA_1$ is equal to $SV_1+s_1$ and the flight surface of skid $PA_2$ is equal to $SV_2+s_2$. The flight surface of the platform is thus equal to: $SV_1+s_1+SV_2+s_2=SV$.

As can be seen in FIG. 1a, which shows the platform $PL_a$ in flight above a magnetic record carrier such as a magnetic disc DISC, which is moving at a constant speed in the direction of arrow f, the platform is slightly inclined to the surface of the disc so that the air gaps $E_1$ and $E_2$ of transducers $TR_1$ and $TR_2$ are situated at a flight altitude $a_1$ above the disc. Altitude $a_1$ is less than the flight altitude $a_2$ of the bevels $CH_1$ and $CH_2$ above the disc. The flight surface SV forms an angle with the surface of the disc. This angle is very small, being of the order of a few milliradians. It can also be seen that bevel $CH_1$ is situated at the front of the flight surface of the main body $CPL_a$, which will be designated AVSV. Similarly it can be seen that the air gaps $E_1$ and $E_2$ are situated at the rear of the flight surface, which will be designated ARSV. It is assumed that platform $PL_a$ is of the "moving" type. One of the ends of the suspension device $SUSP_a$ is fixed by any suitable means to a rigid removable arm (also not shown) which carries the platform $PL_a$ and which is for example secured to a carriage (also not shown) situated clear of the data carrier which enables the platform to be moved with respect to the data tracks on the carrier. In the case of a disc, the platform is moved radially above (adjacent) the circular recording tracks on the magnetic disc DISC. The other end of the suspension device $SUSP_a$ is fixed to the main body $CPL_a$ of the platform $PL_a$ in a groove or channel G formed in the upper face of the platform.

It can clearly be seen in FIG. 1d that the channel G and the groove R are orthogonal to one another. As hereinbefore explained, the simultaneous presence of the channel G and the groove R reduces the rigidity or stiffness of the platform.

It can also be seen from FIG. 1 that the suspension device $SUSP_a$ is positioned substantially above the center of gravity GR of the platform $PL_a$, which causes a certain instability on the part of the platform when flying above the disc DISC, a cushion of air is created between the flight surface SV and the surface of the disc and this cushion exerts a pressure $F_p$ on the platform proportional to the area of the flight surface and equal to $k \times SV$ (k being a factor of proportionality).

To achieve dynamic equilibrium when the platform flies above the disc DISC, a force $F_c$ is applied to the upper face of the platform. This force may be applied by means of a pivot P for example. This loading force $F_c$, which is of the order of 10 to 20 grams, is usually provided by a flexible strip (not shown) which acts as a leaf spring.

The flight altitude $a_1$ of the air gaps $E_1$ and $E_2$ of the transducers $TR_1$ and $TR_2$ is thus maintained substantially equal to 0.4 to 0.5 microns.

Figure 3:
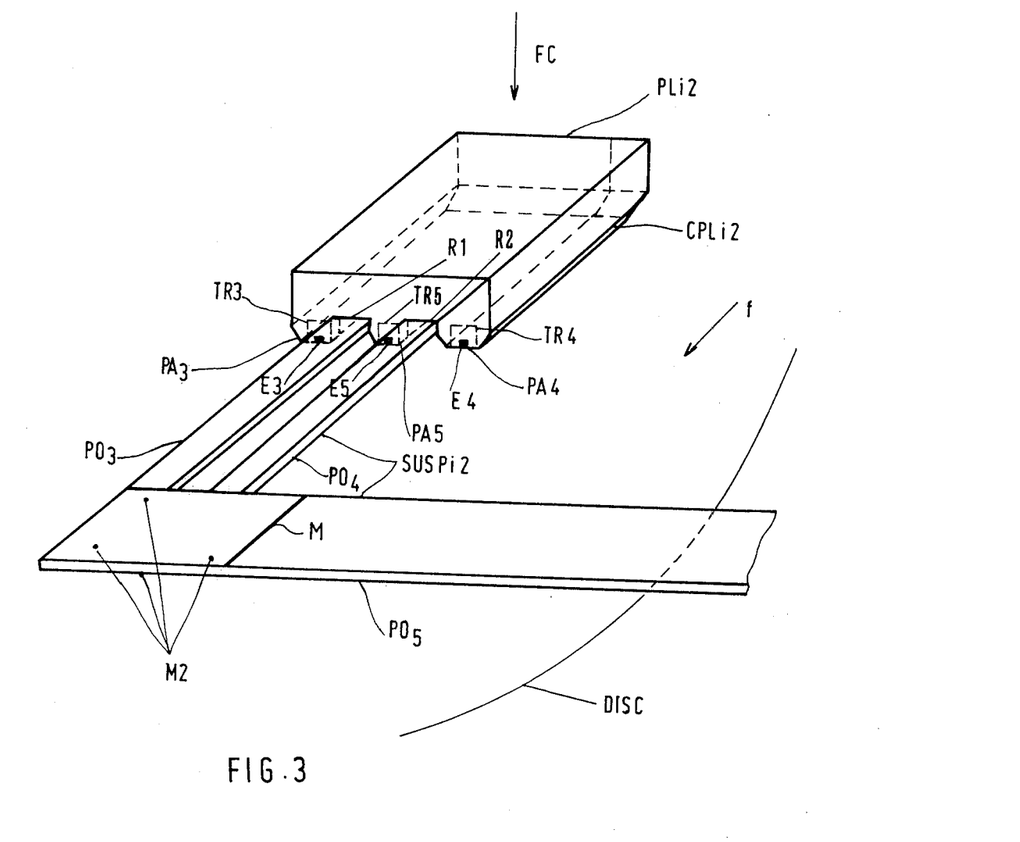
FIGS. 3 and 4 are three-quarter perspective views showing preferred embodiments of the platform according to the invention, the platform being shown in flight above the magnetic disc.
Figure 4:
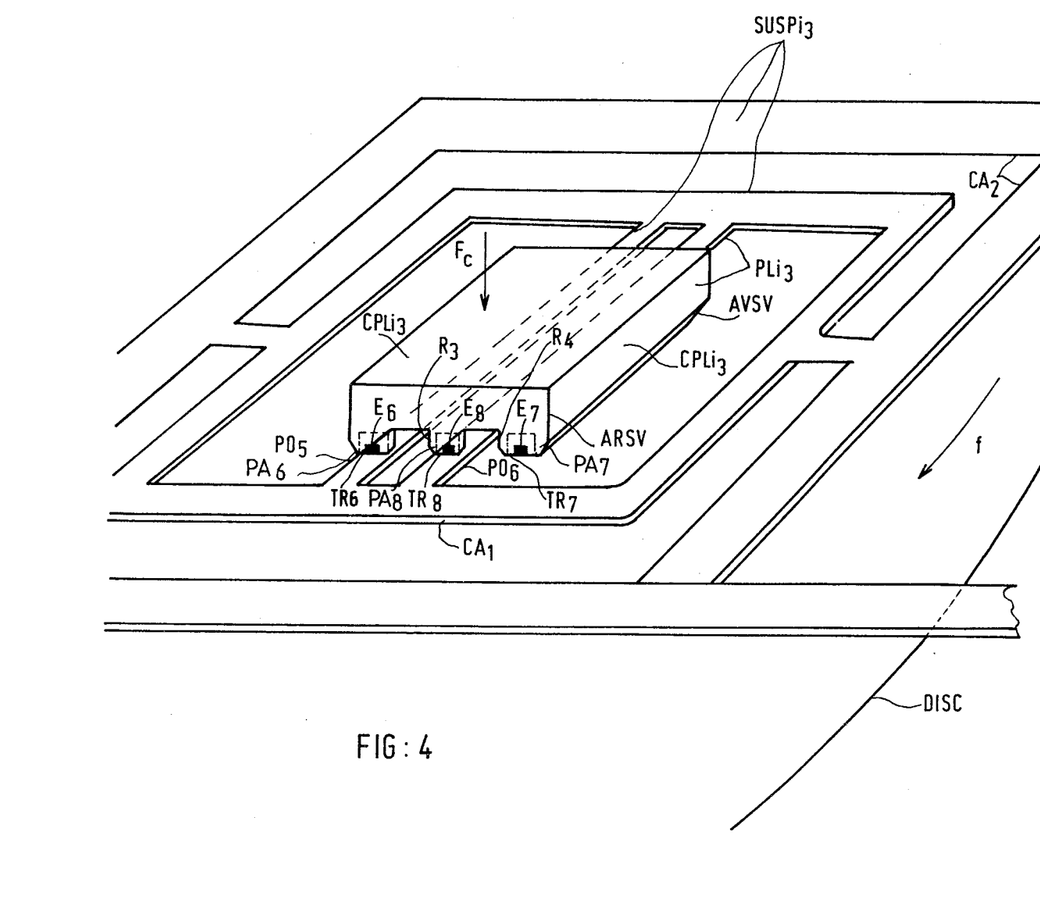

Reference will now be made to FIGS. 2, 3 and 4 which show preferred embodiments of platform according to the present invention. The platform is illustrated in flight adjacent and in the direction of of arrow f.

Referring firstly to FIG. 2, in accordance with the invention, the platform $PLi_1$, which is of the "catamaran" type, has a suspension device $SUSPi_1$ of the platform in a groove R. Groove R is situated between the skids or longitudinal rails $PA_1$ and $PA_2$ which incorporate and support transducers $TR_1$ and $TR_2$, respectively, transducers $TR_1$ and $TR_2$ have respective air gaps $E_1$ and $E_2$. It should be apparent that in FIG. 2 items corresponding to identical items shown in FIG. 1 are identified by the same reference numerals for convenience and to better highlight the inventive concept and resulting structure of the invention.

Thus, the device $SUSPi_1$ for suspending the platform $PLi_1$ according to the invention is arranged in groove or bleed slot R as close as possible on the one hand to the center of gravity $GRi_1$ of the main body $CPLi_1$ of the platform and on the other hand to the face of the disc DISC with which platform $PLi_1$ is associated. This arrangement endows the platform with considerable stability in flight. In the most preferred supporting arrangement, the suspension device $SUSPi_1$ passes through the center of gravity $GRi_1$ of the platform, which increases this inflight stability still further. It can also be appreciated that the invention makes it possible to dispense with the channel G which was formed in the upper face of the prior art platform $PL_a$ and enables the suspension device to be secured in the channel between the skids or rails $PA_1$ and $PA_2$, the longitudinal axes of the channel and skid being parallel to each other.

As shown in FIG. 2a, the suspension means $SUSPi_1$ comprises a single extremely rigid strut $PO_1$ which is fixed at one end in the groove or bleed slot R for example by a suitable bonding or welding process or by means of screws. Strut $PO_1$ is attached at its other end in a suitable manner to one end of a second strut $PO_2$ of larger cross-section by a conventional junction means, which may simply take the form of attaching rivets. The junction area is highlighted for convenience by solid lines M. Strut $PO_2$, which is also extremely rigid, is fixed at its other end by suitable means (not shown) to the removable rigid arm remote from the platform which carries the platform $PL_1$.

Reference will now be made to FIG. 3 which shows a platform $PLi_2$ of the "trimaran" type, that is to say to platform which has three skids $PA_3$, $PA_4$, $PA_5$, between which are situated two grooves $R_1$ and $R_2$. The skids or longitudinal rails $PA_3$, $PA_4$, $PA_5$ incorporate respectively three transducers $TR_3$, $TR_4$, $TR_5$ which each have an air gap $E_3$, $E_4$ or $E_5$. The means $SUSPi_2$ for suspending the platform $PLi_2$ comprises two struts $PO_3$ and $PO_4$, which are extremely rigid and preferably identical and which are fixed at one end and in the grooves or bleed slots $R_1$ and $R_2$ in the main body $CPLi_2$ of the platform $PLi_2$ and at the other end to one end of a second strut $PO_5$ of larger dimensions and also of great rigidity, via junction means $M_2$. The other end of Strut $PO_5$ is connected by means which are not shown to the rigid releasable arm which carries the platform $PLi_2$. The struts $PO_3$ and $PO_4$ are preferably situated in a plane parallel to the surface of the disc DISC and preferably are situated in a plane which passes through the center of gravity $GRi_2$ of the platform $PLi_2$ to maximize the stability of the platform in flight. The struts $PO_3$ and $PO_4$ are also parallel to the longitudinal axes of the skids or rails.

In FIG. 4 is a platform $PLi_3$ according to the invention of the "trimaran" type which has three skids or longitudinal rails $PA_6$, $PA_7$, $PA_8$ which incorporate respectively three reading and/or recording transducers $TR_6$, $TR_7$ and $TR_8$ each having an air gap $E_6$, $E_7$ or $E_8$, respectively. The means $SUSPi_3$ for suspending the platform $PLi_3$ comprises two rigid struts $PO_5$ and $PO_6$ which are fixed respectively in the grooves or bleed slots $R_3$ and $R_4$ in the main body $CPLi_3$ of the platform $PLi_3$ and which are also connected to a rigid rectangular frame $CA_1$. Frame $CA_1$, as can be seen from FIG. 4, encircles the platform $PLi_3$ and is in turn connected to a second rectangular frame $CA_2$ of larger dimensions which also encircles the platform. That is to say frames $CA_1$ and $CA_2$ are concentric. Frame $CA_2$ is connected by suitable means (not shown) to the arm (also not shown) which carries the platform $PLi_3$. As in the case of FIG. 3, the struts $PO_5$ and $PO_6$ are preferably situated in a plane which passes through the center of gravity $GRi_3$ of the platform $PLi_3$ and which is parallel to the surface of the disc DISC. Frames $CA_1$ and $CA_2$ also are preferably situated in this plane.

While the invention has been defined with respect to particular embodiments, it should be apparent that the description is not given by way of limitation and other variations will suggest themselves to those having ordinary skill in the art and for a full appreciation of the full scope and true spirit of the invention, reference should be made to the appended claims.

I claim:

1. A platform adapted to be supported by a carrier arm for positioning the platform adjacent a moving data carrier, the platform and moving data carrier having air bearing spacing therebetween, comprising a main body having a lower face and an upper face, at least one transducer for reading and/or recording on the data carrier, said transducer being supported on the lower face of the main body and arranged to face the data carriers and suspension means for carrying said platform, said suspension means being connected to said lower face of the main body, and said lower face includes a plurality of longitudinal rails, at least one bleed slot disposed between said longitudinal rails and said suspension means being fixed in said bleed slot.

2. A platform according to claim 1, wherein each of the longitudinal rails includes a transducer for reading and/or recording on the data carrier.

3. A platform according to claim 1 or 2, wherein the main body of said platform is of the cataraman type including two longitudinal rails and a bleed slot therebetween formed in the lower face, said suspension means comprising a first rigid strut and a second rigid strut, the first rigid strut having one end fixed in the said bleed slot and the other end is fixed to one end of the second rigid strut, the other end of the second rigid strut adapted to be secured to the carrier arm.

4. A platform according to claim 3, wherein the said first strut is disposed in a plane which passes through the center of gravity of the platform.

5. A platform according to claim 1 or 2, wherein said platform is of the trimaran type including three longitudinal rails and two bleed slots, formed in the lower face, said suspension means comprising identical first and second rigid parts each of which has a first end fixed in one of the two bleed slots and a second end both fixed to a third rigid strut, said third rigid strut adapted to be secured to the carrier arm.

6. A platform according to claim 5, wherein the first and second struts are situated in the same plane, the said plane passing through the center of gravity of the platform.

7. A platform according to claim 1, wherein said platform is of the trimaran type including three longitudinal rails and two bleed slots formed in the lower face, said suspension means comprising identical first and second rigid struts each of which have a first end fixed in one of the two bleed slots and their second ends both fixed to a first rigid frame, a second rigid frame connected to said first frame, said second frame adapted to be secured to the carrier arm.

8. A platform according to claim 7, wherein the first and second struts are situated in the plane, said plane passing through the center of gravity of the platform.

9. A platform according to claims 7 or 8, wherein said second frame is larger than said first frame and said first and second frames are concentric.

10. A platform according to claim 9, wherein said first and second frames are disposed in a common plane.

11. A platform according to claim 10, wherein said common plane passes through the center of gravity of the platform.

* * * * *